Dec. 15, 1936.       D. H. WELLS        2,064,510
FILTER
Filed April 5, 1934
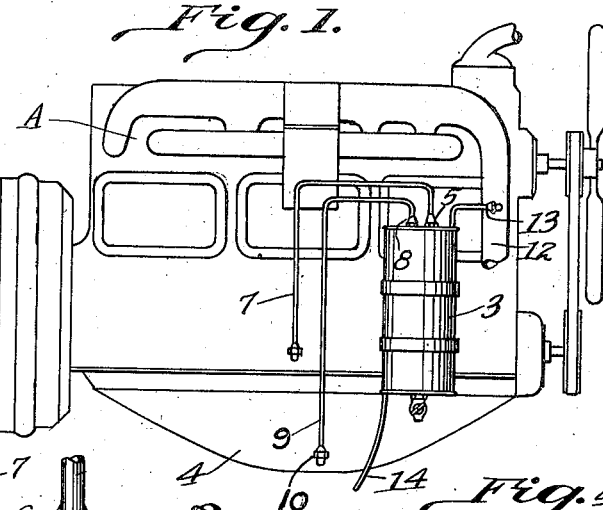
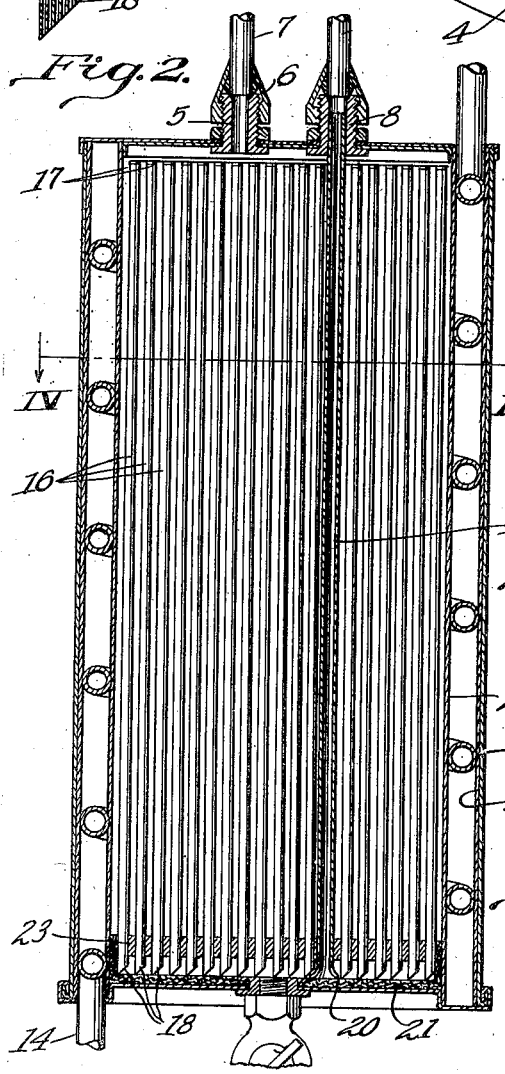
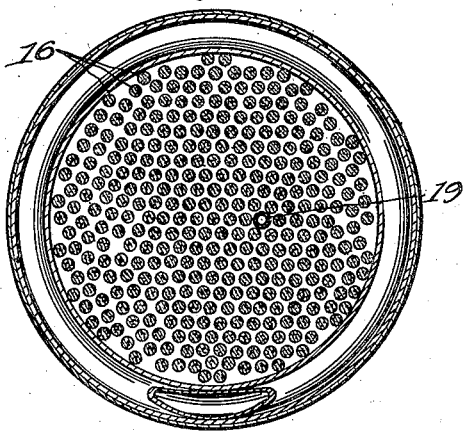
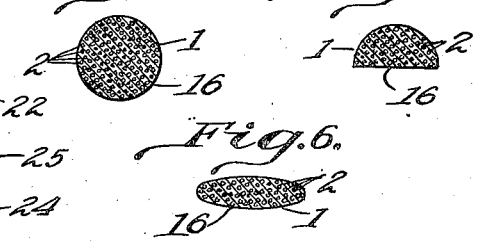
Inventor
Donald H Wells
Attorney Patented Dec. 15, 1936

2,064,510

UNITED STATES PATENT OFFICE 2,064,510

FILTER

Donald H. Wells, Croton, Ohio

Application April 5, 1934, Serial No. 719,150

10 Claims. (Cl. 210—164)

This invention relates to the art of filtering liquids to effect the removal therefrom of undesired solids, and has particular reference to the discovery of a novel filtering medium or media which will remove fine solids from the liquids undergoing filtration. In other aspects, the invention has reference to the operation of my improved filtering media and their adaptations to various uses. Accordingly, it is an object of the present invention to provide an improved filtering media which will remove fine solids from liquids, and, also, an improved method of reducing the accumulation of solid particles of deleterious matter in the lubricating system of an internal combustion engine through the provision of a new type of filter which operates to filter the lubricating oil and remove the objectionable solids while the oil is retained within the engine.

My invention is also applicable to the filtration of lubricating oils used in Diesel engines or in the engines of trucks, tractors, automobiles, aircraft, motor boats, and stationary internal combustion engines, either when being used in the engines or after removal therefrom. It will be understood, however, that the invention is not limited to the filtration of lubricating oils alone as it may be applied to filtering solids from liquids such as other types of oils, including transformer oils, or to naphthas, fuel oils, gasoline, crude oil, emulsions, water, acids, and/or water solutions such as sugar and the like. In fact, my invention may be employed in any field of use involving filtration problems where the clarity required will warrant the rate of the produced filtrate.

One of the outstanding objects of the present invention is the provision of a novel filter medium consisting of a plurality of parallel rattan reeds, or other equivalent wood or woody material provided with minute channels extending longitudinally thereof so that when said medium is properly placed in a fluid-tight filter shell, the reeds will function to remove fine solids from liquids forced therethrough to effect the formation of a filter cake around the outer surfaces of the reeds and the desired passage of the solid freed liquids through said reeds to the outlet of the filter.

As a result of the development of my improved filtering medium comprising rattan reeds, or other equivalent porous woody materials having fine longitudinally extending channels, other objects of the invention are:

To actually remove the solids from a crank case oil in one pass, the filter comprising the present invention belonging to that class of filters which removes practically all of the solids in one pass to produce a brilliant oil, with the aid of supplementary heat.

The provision of a filter which when attached to an engine will employ a sufficiently low flow of crank case oil so that the full oil pressure of the engine can be applied to the filtering medium at a temperature of approximately 140° F. or above, and so that a quantity of oil will pass through the filter which will be small enough so as not to disturb the temperature of the crank case oil in the engine and yet the filter will have a sufficient area and filtering capacity to keep the oil in the engine clean over a prolonged period of time.

Another object resides in a filter which will possess more square feet of area per unit volume of container than any other filter medium known, and still allow the same volume of filter cake to be formed.

When properly applied, as an attachment filter, the present invention will maintain the circulating oil in the crank case of an associated internal combustion engine in a cleaner condition and with a lower solid content than filters of the prior art.

A further object is to reduce the number of mechanical failures and the cost of maintenance of truck, tractor, Diesel and automobile engines when the filter comprising the present invention is attached thereto.

The provision of an improved flexible filtering medium that will bend under pressure without breaking as the filter cake is formed.

The provision of an inexpensive filtering medium which may be economically discarded after use and formation of a dense filter cake thereon, and which provides for the substitution of a fresh filter medium for the one replaced.

Filter medium of the types commonly used for filtering truck, tractor and automobile lubricating oils may be divided into two general classes; first, those which remove practically all solids in one passage of the oil through the filtering medium and, second, those which do not. The first class requires supplementary heat and have a low rate because of the tightness of the filter cake formed thereon and it is to this class of filters that the present invention is particularly applicable.

Prior art devices and methods in filtration of engine oils and the like include felt and cloth type filters, centrifuges, settling systems and the metal disk and wire wound filters. The oil may be cleaned either while being used in the engine or after removal from it, but with the exception of the fibrous washer type of filter, all are considered to be less efficient compared to the filter media comprising the present invention from data obtained as a result of many comparative tests, and the fibrous washer type of filter is less efficient, as compared with the present filter if the same size filter is used.

My invention consists in the provision of a novel filtering medium comprising any pervious material of a woody nature having the proper openings or channels within it for passage or drainage of the filtered liquid, the said filter media being placed in a liquid-tight container so that the liquid to be filtered may be forced by vacuum or pressure through the pores or interstices of the filtering medium, the solids remaining on the outer surfaces of said medium. The longitudinal drainage openings within the filtering medium are preferably those as formed by nature in certain types of woody growths, but in other instances may be artificially produced. This filter medium may be made of any kind of wood or porous woody material of any diameter, length, or size with a longitudinal passage or passages suitably formed therein for filtrate flow and, if desired, holes properly placed for feed passages.

After extended experimentation, I find that at present the preferred form of my filtering medium comprises the core of the rattan, frequently used in making reed or wicker furniture, Chinese reeds also used in making wicker furniture and employed as toy balloon sticks, Japanese reeds and the like. The reeds may be preferably round in cross section, or split to provide half round sections, or split to produce flat parallel sides, each reed whether split or not, being provided with one or more longitudinal channels or passages extending substantially the full length of the reed. At present a $\frac{3}{32}$ inch O. D. split (half round) reed or a smaller round reed is preferred. The reeds may be straight or coiled, as cut or after treated, to vary their porosity, and adapting the reeds to various uses. The same may or may not be treated prior to being placed into service by drying the same under vacuum, subjecting the same to varying degrees of heat; partial digestion by treatment with water, alkalies, acids, or wood "digesters", such as calcium or magnesium, bi-sulphite, the halogens or other treating reagents commonly used when pulping wood at high or low temperatures and high or low pressures. Also, the reeds may be subjected to various mechanical treatments, such as rolling, twisting, coiling and/or cutting the surface with sharp tools, or treatment with fungi. Other tests indicate that in the preferred form of the invention, it is preferable that the reeds should be rolled between steel or rubber rollers to slightly crush the same and then twisted.

I understand rattan core to be made from the rattan after the bark is removed. There are more than a dozen different kinds of climbing vine-like palms growing in the jungles of the Dutch East Indies, the Philippine Islands, and the Malay Peninsula, which are called rattan and which yield porous woody materials suitable for the present invention. While these rattans are treated more or less accurately, generally with some mis-information, in various encyclopedias, the best article regarding them that has been brought to my attention is entitled "Rattan Malayan Series No. XVII, British Empire Exposition, 1924". This paper contains a general description of the plants, the methods of collecting and preparing the material, the numerous middlemen between the collector and the market at Singapore, and various general statements about the industry. The names of the principal species are given as follows:

*Calamus caesins* Bl.
  Rotan Sega or Botan Sega Perak.
*Calamus palustris* Griff.
  Rotan Sega Ayer, Rotan Sembuang, or Rotan Sega Badak.
*Calamus scipionum* Lour.
  Rotan Semambu or Malacca cane.
*Calamus insignis* Griff.
  Rotan Batu.
*Calamus pencillatus* Roxb.
  Rotan Tunggal, Rotan Lilin.
*Calamus ornatus* Bl.
  Rotan Manau.
*Calamus* sp.
  Rotan Kertas, Rotan Kerai, Rotan Kikir.
*Korthalsia* sp.
  Rotan Senik.
*Daemonorops hystrix* Mart.
  Rotan Sabut.
*Daemonorops* sp.
  Rotan Cheriau, Rotan Ayer
  Rotan Tawa, Rotan Getah
  Rotan Jerenang.
*Plectocomia griffithii* Becc.
  Rotan Dahau.

These vines are collected as a jungle growth and are most frequently taken to Singapore, or sometimes to Canton, China, where they are scraped to remove the bark. Some of them are split to be used for various purposes and some are drawn through holes in steel plates to reduce them to uniform diameters which are known in the market as reeds. I therefore employ the term "reeds" hereinafter as descriptive of the woody growths of the character identified.

Wood has a "grain" which usually is not of sufficient area to form filtrate passages. In reeds, the grain is pronounced and definite longitudinal channels in respect to the size of the reed exist. These channels are sufficiently large to carry the filtrate to the filtrate compartment of the filter.

To facilitate a further understanding of the invention and the use of the reeds as a filter medium, reference is to be had to the accompanying drawing, in which:

Fig. 1 is a side elevation of an internal combustion engine and a filter containing the filter medium forming the present invention in operative relationship in connection therewith;

Fig. 2 is a vertical longitudinal sectional view taken through the filter;

Fig. 3 is a view on enlarged scale in longitudinal section of one of the reeds employed in the filter;

Fig. 4 is a transverse sectional view therethrough on the line IV—IV of Fig. 3;

Fig. 5 is a similar view of the round type of reed;

Fig. 6 is a similar view through a flat type of reed;

Figs. 7 and 8 are similar views of reeds possessing other cross sectional configuration.

In the drawing, the numeral 1 refers to the pervious surface of the reed through which the liquid is forced and which retains the solids on the outside of the reed and the numeral 2 designates the longitudinal channel or channels formed in each reed through which the filtered liquid is conducted through or away from the reed. A preferred application of my filter media resides in its use as an attachment filter to remove the solids from the crank case oil of a truck, tractor, automobile, internal combustion engine without removing the oil from the motor proper. One form of such a filter in which my invention may be employed is shown in Figs. 1 and 2.

In Fig. 1, the internal combustion engine is designated at A, and is provided exteriorly with the filter 3 suitably mounted and supported in connection with the engine. The engine may be of the usual type, having a crank case 4 containing the main body of circulating oil which is forced to the bearings and/or splash troughs of the engine by means of a suitable pump. A branch from the oil line, such as the oil-pressure gauge line, is connected to the filter inlet 5 by means of the connection 6 and the tube 7. The filter outlet (filtrate connection) 8 is connected by means of the tube 9 to a fitting 10 preferably below the level of the oil in the crank case. A check valve may be placed in the line 9 in any suitable location to permit the filtrate to flow to the crank case but to prevent reverse flow.

Exhaust tubing of the desired size may be connected to the exhaust manifold 12 at a convenient opening 13. The exhaust gases will thus be conducted around the filter shell or casing to heat it and also the oil in the filter, the vitiated gases being eventually exhausted to the atmosphere as at 14. With this arrangement, a small portion of the oil circulated in the engine is by-passed through the filter and then returned to the engine. With my filter medium, which removes the solids in one pass, much smaller quantities need be by-passed than is necessary with filters of greater porosity.

In adapting the reeds, indicated at 16, to the filter shell, the said reeds are preferably split from $\frac{3}{32}$ inch round reeds, as shown in Fig. 5, making them half round, as indicated in Fig. 7, or are flat and thin as set forth in Fig. 6. These reeds are selected for a desirable porosity and may or may not be chemically treated as stated above, although at present, I prefer that the reeds will be rolled between steel or rubber rollers and slightly twisted. The ends 17 of the reeds, which are to be located contiguous to the oil inlet 5 of the shell, are sheared or otherwise treated to pinch the reeds at that end thereof to close the longitudinal drainage passages 2, or they may be cut and sealed with a suitable cement, as indicated, of which a phenol-formaldehyde resinoid (for example, bakelite resinoid known as BR–0013–14, made by the Bakelite Corporation, New York city, New York). The resinoid known as BR–0014 possesses a low viscosity without the use of a solvent, whereas the resinoid BR–0013 diluted with a solvent such as alcohol may be used. The resinoid closes the ends 17 of the reeds preventing the dirty oil from entering the channels positioned contiguous to the inlet 5, without passing through the pervious outer surfaces of said reeds, which it will be observed are held in spaced parallel relationship within the shell. The other ends 18 of the reeds are preferably cut diagonally, as shown in Fig. 3, with a sharp tool to preserve the drainage openings 2. A correct number of reeds of desired length may be bunched together with the filtrate outlet tube 19, and the "clean" ends 18 of the reeds and the inner end of the tube may be protected from the cementing operation as hereinafter described and which is employed to produce a common passage or opening by which the ends 18 of the reeds relatively communicate in order that the filtrate discharged from the channels 2 of said reeds may, without coming into contact with "dirty" oil, be led to the tube 19, discharged from the filter and returned to the crank case at the fitting 10, or other desired location.

To seal the ends 18 of said reeds to provide for their desired communication with the tube 19, many different methods or constructions may be employed. I have found it a satisfactory and economical practice to employ a cement for accomplishing this purpose which resists the action of the temperatures and liquids encountered in the operation of the filter. Thus in a preferred form, the clean ends 18 of the reeds 16 and the inner end of the tube 19 may be protected from the cement or molded "bakelite" composition, with a high melting point solid such as chlor-naphthalene (e. g. Halowax No. 1013 or 1014 made by the Halowax Corporation, New York city, New York), wax melting at a temperature between 200° F. and 300° F. by dipping these reed and tube ends in the melted wax. The exposed portion of the wax is then covered with one or more cloth cups after the wax has solidified. The cloth is shown embedded in the cement at 20. A phenol-formaldehyde resin (e. g. bakelite BR–0013 with sufficient alcohol to thin it so that it will flow between all the reeds, or bakelite BR–0014, a pure resinoid that will have a low viscosity without a solvent) is added to a close fitting waxed form and the waxed reed assembly added thereto. More cement may be added to the form, and each addition may be warmed before being placed in the form. The whole assembly is dried at a temperature below the boiling point of the solvent, if such is employed, until the solvent has evaporated and then baked until hard in an oven with uniform temperature and under increasing degrees of heat. With cement BR–0013, a final temperature not exceeding 300° F. is preferred. Tests indicate that if a solvent is necessary to reduce viscosity, a low melting point wax, such as 140° F., may be used.

It may be an advantage to employ a low melting point wax as one is assured that all wax will be melted at the filtering temperature and therefore positively removed. The cement forms may be removed before the final stages of baking, if desired. When planning to use a high pressure of air or liquid on the filtering media in the opposite direction of filtration, in other words, a back pressure, such as may be used for effecting the discharge of the filter cake from the exterior surfaces of the reeds, the cement must be made thicker to resist this pressure. Holes in the wax between the reeds will permit the cement 23 between the reeds to attach to the cement 21 on the end, thereby reenforcing this molded assembly. These points of attachment however, do not interfere with the flow of oil through the spaces provided between the opposed walls 21 and 23 of the molded reed holder.

After baking, the wax may be removed with hot oil although in most instances, this has been found unnecessary. During baking, wax disappears from the space occupied by it while solid, apparently by evaporation or absorption into the reeds. The finished reed assembly, it will be noted, is self-contained and may be placed in any kind of liquid-tight container by simply attaching the outer end of the tube 19 by means of a pressure-tight connection through the end of the shell. When the whole filter is to be discarded after use, the shell will be made of sheet metal because of its cheapness. However, when the reed assembly only is to be discarded after use, the shell may be made of heavier material and with a removable end, through which the outer end of the tube 19 may be connected by a pressure-tight joint. The reeds may be used with or without a pre-coat of a "Filteraid" such as activated carbon, kieselguhr, diatomaceous earth, bentonite, fuller's earth, or the like.

The filter is preferably heated with exhaust engine gases, as in Figs. 1 and 2, the gases passing in either direction through the tubing 15 which may be wrapped around the filter shell 22 and the whole covered with a sheet metal jacket 25 which may contain an insulating lining 26 made of asbestos or other similar material. While this construction is preferred, it will be understood that the invention is not limited to the step of heating the oil in the filter shell. For instance, thermostatic control of the temperature of the oil in the filter may be employed, the filter may be heated by a jacket or tubing coiled within the oil itself, and hot water or exhaust gases conducted through these. With engines where the oil normally obtains a temperature of 140° to 150° F., or higher, a portion of the oil surrounding the reeds may be returned to the crank case, possibly through the pressure-relief valve in the oiling system, so that the filter will warm with the circulating oil sufficiently to start the filtration. Still another method of heating the filter is merely to locate it in a warm place on the engine. An aluminum shell, or shell made of any heavier material, would serve to conduct heat from the exhaust pipe to the filter.

In other adaptations of my invention, the oil may be removed from the engine and filtered through my filter medium by means of pressure or vacuum. Vacuum filtration has certain advantages over pressure filtration. The filter may be heated in this use with hot water, steam, gas or electricity. In other adaptations, the step of heating may be omitted entirely, such as when filtering aqueous solutions.

The filter may be purged, if desired, of accumulated filter cake by forcing sludge, feed, filtered liquid, and/or liquid other than that being filtered by forcing the purging liquid at high velocity along or across the surfaces of the filtering medium to wash, sluice, or flush the cakes therefrom with or without opening up the filter shell and while or while not forcing the gas or liquid through the filtering medium in a reverse direction to that of filtration.

Among the advantages resulting from the use of my invention are: larger areas may be installed in a container or shell of given unit volume than with any other filter medium of which I have knowledge. I list below a table showing filter areas using different size reeds in comparison with other filtering media.

| Kind of filter medium | Outside diameter (or size) of reed (inches) | Effective square feet of filter area per 1 cu. ft. container | Volume in cu. ft. occupied by filter medium in 1 cu. ft. container |
|---|---|---|---|
| Reed | ¼" O. D. | 72 | 0.41 |
| Do | 5/32" O. D. | 114 | 0.41 |
| Do | 5/32" O. D. split | 185 | 0.41 |
| Do | ⅛" O. D. | 142 | 0.41 |
| Do | 3/32" O. D. | 190 | 0.41 |
| Do | 3/32" O. D. | 285 | 0.41 |
| Do | 1/16" O. D. | 570 | 0.41 |
| Do | 1/32" O. D. | 315 | 0.41 |
| Do | .034" x 7/32" flat | | |
| Cloth | | 1.4 to 15 | (est.) 0.40 |
| Fibrous | 1⅝" O. D. washers | 5 | 0.167 |

When filtering, as the filter cake increases in thickness, it resists the flow or retards the rate of filtration, and the thicker the cake becomes, the slower is the rate of filtration. Large filtering areas are therefore advantageous because the cake formed is much thinner when spread over a large area than when over a small one. For this reason, filters made with large effective filter areas maintain a more constant flow throughout their life than filters with smaller filter areas. Also large areas give a greater capacity per filter than small areas, other conditions being equal. Areas obtainable with my natural filter media (reeds) are greater than with artificially produced filter media. One can not quite conceive of holes being bored or formed longitudinally in wood with the small diameter that exists in rattan, and yet these holes or channels are evenly formed by nature and I have found them to be more than sufficient size to carry away the filtrate of nearly all liquids, and of sufficient strength to resist the pressures encountered.

My improved filter media removes the dirt or solids in one pass, and when used as an attachment filter, the circulating oil of an internal combustion engine is maintained in a cleaner condition and more dirt is removed from the engines than obtains when filters are used which do not remove the dirt in one pass and are not heated.

As contrasted to centrifuges, my filter media have no moving parts in addition to those on the engine and experienced labor is not required for their care. Compared to the best known filter medium, to-wit, the fibrous washer type, my filter media is less costly, in other words, my filter medium is inexpensive to replace. Again, the reed type of filter medium is not fragile. If for some reason the reeds should become broken, the openings therein are so small that loss of oil pressure would not occur. Because of the effective filtering area of my reed filter, long operating cycles may be obtained. The length of the filtering time before discharge of the dirt is necessary, will vary with the spacing of the filtering medium and the amount of dirt in the oil, but should be several days of 24 hour's use. This cycle may be contrasted to cycles of only a few hours with the fibrous washer filter when used to filter oil without removal from the engine or after removal therefrom. Contrasted to filter media which do not remove the finest solids, my filter media will remove with certainty abrasive non-combustible material which is injurious to a motor. Moreover, the reed filter is light in weight and contrary to cloth filter media will not rot or disintegrate under continued use and contact with oil.

What is claimed is:

1. A filter comprising a plurality of wood or woody strips pervious to the action of fluid under pressure, each of said strips containing one or more longitudinally extending channels, means for retaining said strips in assembled substantially parallel order, each of said strips being treated at one end to close the channel or channels therein, the opposite end of each of said strips being supported to render the channel or channels therein open for communication with the channel or channels of adjacent strips.

2. A filter comprising a pressure-tight casing having a fluid inlet and outlet, a filter media arranged within said casing and composed of a plurality of woody strips having longitudinal channels formed therein, the ends of said strips in communication with said inlet being treated to close said channels to fluid flow, and means for supporting the opposite ends of said strips so that said channels will be in open communication with said outlet.

3. A filter comprising a fluid-tight casing formed with an inlet and an outlet, filter media arranged within said casing and comprising a plurality of parallel rattan reeds, said reeds contiguous to said inlet having the naturally occurring channels formed therein closed, and means for supporting the opposite ends of said reeds so that said channels will be in open communication with said outlet.

4. A filter for removing deleterious solids from used lubricating oils employed in internal combustion engines, comprising a fluid-tight casing, means for introducing under pressure the lubricating oil containing the objectionable solids into said casing, a spaced filtrate outlet formed with said casing, filter media arranged between said inlet and outlet means and composed of a plurality of wood or woody strips pervious to the passage of heated oil under pressure and formed with naturally occurring longitudinally extending channels, the said channels being closed to the oil inlet means and open to the filtrate outlet, and means for supporting said media as a removable unit within said casing.

5. A filter media comprising a group of rattan reeds pervious to the passage of heated engine lubricating oil under pressure, each of said reeds being formed with one or more naturally occurring longitudinally extending channels, means for sealing an end of each of said reeds to obstruct the channel or channels formed therein against fluid flow, and thermo-plastic means in which the opposite end or ends of said reeds are embedded with the channels thereof in relative inter-communication.

6. A filter media comprising a group of rattan reeds pervious to the passage of heated engine lubricating oil under pressure, each of said reeds being formed with one or more naturally occurring longitudinally extending channels, means for sealing an end of each of said reeds to obstruct the channel or channels formed therein against fluid flow, and thermo-plastic means in which the opposite end or ends of said reeds are embedded with the channels thereof in relative intercommunication, said thermo-plastic means serving to support said reeds in relatively spaced parallel order to provide for the flow of oil therebetween.

7. The method of removing deleterious solids from lubricating oils employed in internal combustion engines, which consists in heating said oil to a temperature of the order of at least 140° F., and then forcing said lubricating oil in the form of a small stream under pressure through a filter media composed of a naturally occurring woody material, the grain or fibers of which being so formed by nature as to admit of the penetration of the heated oil under pressure from the exterior of said media into small channels extending longitudinally of said media.

8. The method of removing deleterious solids from lubricating oils employed in internal combustion engines, which consists in heating said oil to a temperature of the order of at least 140° F., then forcing said lubricating oil in the form of a small stream under pressure through a filter media composed of a naturally occurring woody material, the grain or fibers of which being so formed by nature as to admit of the penetration of the heated oil under pressure from the exterior of said media into small channels extending longitudinally of said media, removing the filtrate from said channels, and allowing a cake composed of deleterious solids to form on the exterior surface of the filter media.

9. The method of removing deleterious solids from lubricating oils employed in internal combustion engines, which consists in heating said oil to a temperature of the order of at least 140° F., then forcing said lubricating oil in the form of a small stream under pressure through a filter media composed of a naturally occurring woody material, the grain or fibers of which being so formed by nature as to admit of the penetration of the heated oil under pressure from the exterior of said media into small channels extending longitudinally of said media, removing the filtrate from said channels, and allowing a cake composed of deleterious solids to form on the exterior surface of the filter media, and applying extraneous heat to the oil to maintain desired filtering temperatures during the passage of the oil through said media.

10. A filter media for removing solids from liquids comprising rattan reeds crushed and longitudinally twisted.

DONALD H. WELLS.